United States Patent
Young et al.

(10) Patent No.: US 9,046,407 B2
(45) Date of Patent: Jun. 2, 2015

(54) LIQUID LEVEL MEASURING SYSTEM AND METHOD

(75) Inventors: Kimberley Allan Young, Saskatoon (CA); John Francis Grimes, Lampman (CA); Nathan Oliver Peter, Saskatoon (CA)

(73) Assignees: QUEST MEASUREMENT INC., Calgary, Alberta (CA); SASKATCHEWAN RESEARCH COUNCIL, Saskatoon (CA)

(*) Notice: Subject to any disclaimer, the term of this patent is extended or adjusted under 35 U.S.C. 154(b) by 1213 days.

(21) Appl. No.: 12/941,633

(22) Filed: Nov. 8, 2010

(65) Prior Publication Data
US 2012/0116695 A1 May 10, 2012

(30) Foreign Application Priority Data
Nov. 4, 2010 (CA) ..................... 2720325

(51) Int. Cl.
| G01F 23/38 | (2006.01) |
| G01F 23/74 | (2006.01) |
| G01F 23/40 | (2006.01) |
| G01F 23/72 | (2006.01) |
| G01F 25/00 | (2006.01) |

(52) U.S. Cl.
CPC .............. *G01F 23/74* (2013.01); *G01F 23/40* (2013.01); *G01F 23/72* (2013.01); *G01F 23/38* (2013.01); *G01F 25/0061* (2013.01); *G01F 25/0069* (2013.01)

(58) Field of Classification Search
CPC ..... G01F 25/00; G01F 23/40; G01F 23/0038; G01F 23/00; G01F 1/005; G01F 23/284; G01F 23/74; G01F 23/38; G01F 23/72; G01F 25/61; G01F 25/69; G05D 9/00
See application file for complete search history.

(56) References Cited

U.S. PATENT DOCUMENTS

| 5,636,548 | A | 6/1997 | Dunn et al. |
| 2005/0247350 | A1* | 11/2005 | Coakley et al. ............... 137/554 |
| 2005/0268715 | A1* | 12/2005 | Sabatino ......................... 73/313 |
| 2009/0315541 | A1* | 12/2009 | Zak ............................ 324/207.2 |

FOREIGN PATENT DOCUMENTS

EP         1072872        *    1/2001

OTHER PUBLICATIONS

Merriam-Webster Dictionary, http://merriam-webster.com/dictionary/intrinsic—downloaded Jun. 20, 2014.*
EP1072872 Machine Translation.*

* cited by examiner

*Primary Examiner* — Janet Suglo
*Assistant Examiner* — L. Anderson
(74) *Attorney, Agent, or Firm* — Sean D. Detweiler, Esq.; Morse, Barnes-Brown & Pendleton, P.C.

(57) ABSTRACT

A system and method for measuring the liquid level in a tank or container is provided. The system can have a sensor string comprising a plurality of analog output hall-effect sensors and a computer readable memory containing sensor string information, a float having a magnetic field and positionable relative to the sensor string, and a controller containing at least one processing unit, at least one memory and a sensor string interface for connecting the controller to the sensor string. The system can be operative to obtain the sensor string information from the at least one memory of the sensor string, obtain a preloaded waveform indicating the output of a sensor relative to the position of the float and approximate the position of the float relative to the sensor string using the normalized output of at least one of the sensors and the preloaded waveform.

19 Claims, 8 Drawing Sheets

LIQUID LEVEL MEASURING SYSTEM AND METHOD

RELATED APPLICATIONS

This application claims priority to Canadian Application No. 2,720,325, filed on Nov. 4, 2010, entitled LIQUID LEVEL MEASURING SYSTEM AND METHOD (now Patent No. CA 2,720,325). The entire teachings of the above application are incorporated herein by reference.

TECHNICAL FIELD

The present invention relates to a liquid level measuring system and more particularly to a liquid level measuring system that uses a string of hall-effect sensors that produce an analog output voltage when subjected to a magnetic field to approximate the level of a liquid in a container.

BACKGROUND

Liquid level measuring systems using magnetic sensors are commonly used to measure the level of a liquid, such as oil, in a tank or container. Early versions of these liquid level sensors used sensors that could detect a magnetic field. By determining which sensor has detected the magnetic field created by a float, the liquid level sensor can approximate the level of liquid. However, the accuracy of this level determination often required the sensors to be quite close together or the magnetic float to be a complicated system of magnets to try and increase the accuracy of the depth approximation.

Some later liquid level sensors, such as the system described in U.S. Pat. No. 5,636,548 to Dunn et al, used hall-effect sensors that could produce an analog output signal in response to the sensors coming into contact with a magnetic field from a float. This allowed the depth of the liquid in the tank or container to be approximated with greater accuracy, however, it required extensive calibration of the system to provide these readings. In this system, the float must be moved relative to each sensor to determine the voltages corresponding to each position of the float relative to the sensor to calibrate the system for use. This calibration may also become less accurate as the measuring system and its sensors age. It also requires specific numbers of sensors and spacing between the sensors requiring the system to be designed for a specific size of tank or container. Thus, while these systems have increased accuracy, they require extensive calibration and must be designed quite specifically for the intended tank or other application for the system to function properly.

SUMMARY OF THE INVENTION

In a first aspect, a liquid level measuring system is provided. The system comprises: a sensor string comprising a plurality of analog output hall-effect sensors and at least one computer readable memory, each sensor spaced a sensor spacing away from an adjacent sensor, the at least one computer readable memory containing sensor string information including the number of sensors in the sensor string and the position of each sensor in the sensor string; a float having a magnetic field and positionable relative to the sensor string; and a controller containing at least one processing unit, at least one memory and a sensor string interface for connecting the controller to the sensor string. The processing unit is operative to: obtain the sensor string information from the at least one memory of the sensor string; obtain a preloaded waveform indicating the output of a sensors relative to the position of the float; and approximating the position of the float relative to the sensor string using the normalized output of at least one of the sensors and the preloaded waveform. The preloaded waveform is stored in at least one of: the at least one computer readable memory of the sensor string; and the at least one memory of the controller.

In a second aspect, a method for measuring a liquid level in a container is provided. The method comprises: providing a container for holding a liquid having a depth; selecting a sensor string having a distal end, a proximate end and a length corresponding to the depth of the container, the sensor string comprising a plurality of analog output hall-effect sensors and at least one computer readable memory, each sensor spaced a sensor spacing away from adjacent sensors, the at least one computer readable memory containing sensor string information including the number of sensors in the sensor string and the position of each sensor in the sensor string; installing the sensor string in the tank, positioning a float containing at least one magnet so that the float is positioned adjacent to the sensor string and connecting the sensor string to a controller; the controller obtaining the sensor string information from the sensor string; and when liquid is in the tank, the controller approximating the position of the float relative to the sensor string using the normalized output of at least one of the sensors and a preloaded waveform indicating the output of the sensors relative to the position of the float.

DESCRIPTION OF THE DRAWINGS

A preferred embodiment of the present invention is described below with reference to the accompanying drawings, in which.

DETAILED DESCRIPTION OF THE ILLUSTRATED EMBODIMENTS

Figure 1:
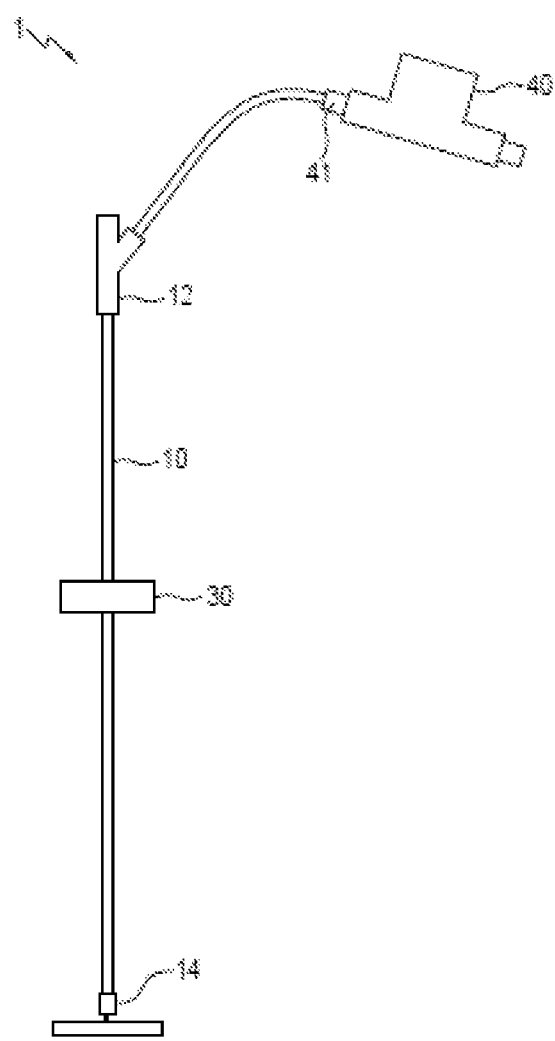
FIG. 1 is a schematic illustration of a liquid level measuring system.

FIG. 1 illustrates a liquid level measuring system 1 that is used to measure the level of a liquid in a tank, etc. The liquid level measuring system 1 is used inside a tank or other container to determine the level of the liquid, such as oil, water, chemical, etc., in the tank. The liquid level measuring system 1 includes a sensor string 10, a float 30 containing one or more magnets and a controller 40. The sensor string 10 is positioned substantially vertically in the tank and the float 30 is placed surrounding the sensor string 10. By obtaining measurements of magnetic fields sensors 20 in the sensor string 10 are subjected to by the float 30, the controller 40 can approximate the position of the float 30 and therefore the level of liquid in the tank.

Figure 2:
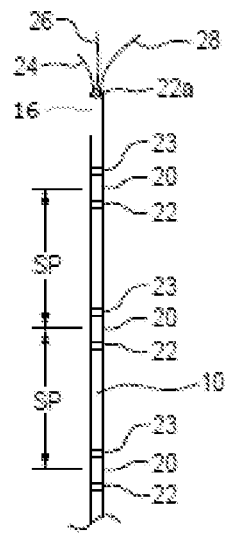
FIG. 2 is a schematic illustration of a sensor string.

FIG. 2 illustrates the sensor string 10 that is used to detect a magnet field produced by the float 30. The sensor string 10 can have a proximate end 12 and a distal end 14 with a plurality of hall-effect sensors 20 spaced at regular intervals along the sensor string 10. Each hall-effect sensor 20 can detect the presence and/or changes in a magnetic field and output an analog signal that is proportional to the strength of a magnetic field passing through the sensor 20. Each sensor 20 is spaced apart from adjacent sensors by a sensor spacing SP. In one aspect, this sensor spacing SP is approximately 20 cm between adjacent sensors 20. The sensors 20 can be provided inside a non-magnetic enclosure 16 such as stainless steel, extruded plastic sleeve, etc. so that the enclosure 16 can surround and protect the sensors 20 from the liquid the sensor string 10 is placed in.

In one aspect, the enclosure 16 can be formed from an extruded plastic sleeve where the plastic material forming the enclosure 16 has been selected to allow the sensor string 10 to have a suitable bend radius, allowing the sensor string 10 to be coiled up for packaging and/or transport.

Each sensor 20 can be connected to a cable 22 to transmit output voltage signals from the various sensors 20 to the controller 40. In one aspect, the cable 22 can comprise a three wire cable, with two wires 24, 26 to supply power to the sensors 20 in the sensor string 10 and one wire 28 to act as a communication wire, allowing the output voltages produced by the sensors 20 to be transmitted to the controller 40.

Each sensor 20 can be associated with a computer readable memory 22 that stores information about the sensor 20 and the sensor string 10. At least one of these memories 22A will include the sensor spacing SP of the particular sensor string 10 and the number of sensors 20 in the sensor string 10, while each of the memories 22 can include the position of the associated sensor 20 within the sensor string 10. In one aspect, the memory 22 could be non-volatile memory so the information is not lost when the sensor string 10 is not connected to a power source.

Each sensor 20 can have a communication chip 23 that can communicate through cable 22 to the controller 40. If the sensor 20 is connected to a cable 22, the communication chip 23 can be connected to the wire 28 used to communicate with the controller 40.

The sensor string 10 can have a weight or anchor on a distal end 14 of the sensor string 10 so that the distal end 14 can be positioned and/or attached to the bottom of the container the liquid level measuring device 1 will be installed in.

A connection interface 41 can be provided to allow the sensor string 10 to be connected to the controller 40. This connection interface 41 can be any suitable type of connection to allow the cable 22 to be connected to the controller 40. In some cases, such the type of connection interface 41 may have to selected based on the type of liquid the liquid level measuring device 1 is used with. For example, if the liquid to be used in a hazardous location, the connection interface 41 could have an intrinsic barrier.

Figure 3:
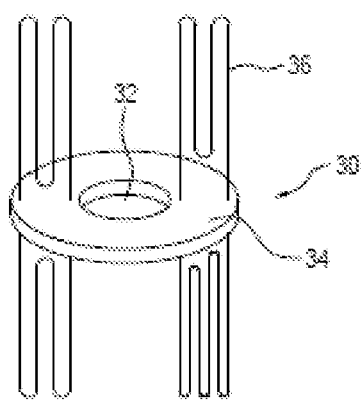
FIG. 3 is a schematic illustration of a float containing one or more magnets.

FIG. 3 illustrates the float 30 in one embodiment. The float 30 is designed to float on the surface of a liquid the liquid level measuring system 1 is used with. The float 30 can have an annular shape that defines an aperture 32 passing through the center of the float 30. The float 30 can contain one or more magnets 34 that create an axial magnetic field 36 surrounding the float 30.

The aperture 32 is sized so that the sensor string 10 can be inserted through the aperture 32 of the float 30. This allows the float 30 to be positioned surrounding the sensor string 10 and coaxial with the sensor string 10, allowing the float 30 to move coaxially relative to the sensor string 10.

Figure 4:
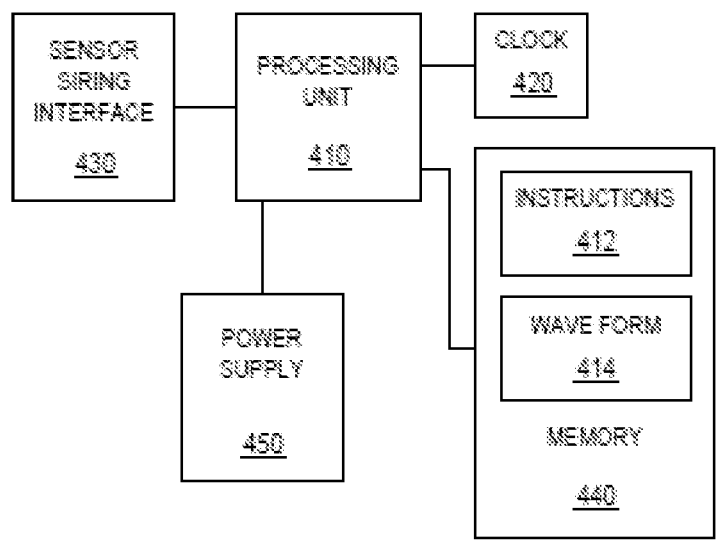
FIG. 4 is a schematic block diagram of a controller.

FIG. 4 illustrates a block diagram of the controller 40 in one aspect. The controller 40 is placed outside the container containing the liquid to be measured. The sensor string 10 can be connected to the controller 40 so that the controller 40 receives the output signals from the sensors 20 in the sensor string 10 and can use these outputs to approximate the position of the float 30 relative to the sensor string 10. The controller 40 can also provide power to the sensors 20 in the sensor string 10 in one aspect.

The controller 40 can include: a processing unit 410, such as a microprocessor; a clock 420; a sensor string interface 430; at least one computer readable memory 440; and a power supply 450. The processing unit 410 can be operative to obtain program instructions 412 from the memory 440 and execute the program instructions 412. The memory 440 can also contain a preloaded waveform 414 indicating an output of the sensor 20 relative to the position of the float 30. The preloaded waveform 414 can be normalized outputs in one aspect.

The memory 440 will typically comprise both non-volatile memory, such as ROM memory which can be used to store the program instructions 412 and volatile memory such as RAM for storing information received from the sensors 20 during operation of the liquid level measuring system 1.

The processing unit 410 can also be operatively connected to the sensor string interface 430 which in turn can be operatively connected to the sensor string 10 (shown in FIG. 1). The sensor string interface 430 can be used by the processing unit 410 to obtain readings of the voltage outputs of the various sensors 20 in the sensor string 10 as well as obtain information from the memories 22 of the sensor string 10, such as the number of sensors 20 in the sensor string 10, the position or each sensor 20 in the sensor string 10 and the sensor spacing SP between sensors 20. When a voltage outputted by one of the sensors 20 is transmitted to the controller 40 by one of the sensors 20, the transmission can also indicate the position of the sensor 20 in the sensor string 10.

The power supply 450 can be used to power the processing unit 410 of the controller 40 and, in one aspect, be used to also supply power to the sensors 20 in the sensor string 10 through the sensor cable interface 430.

Figure 5:
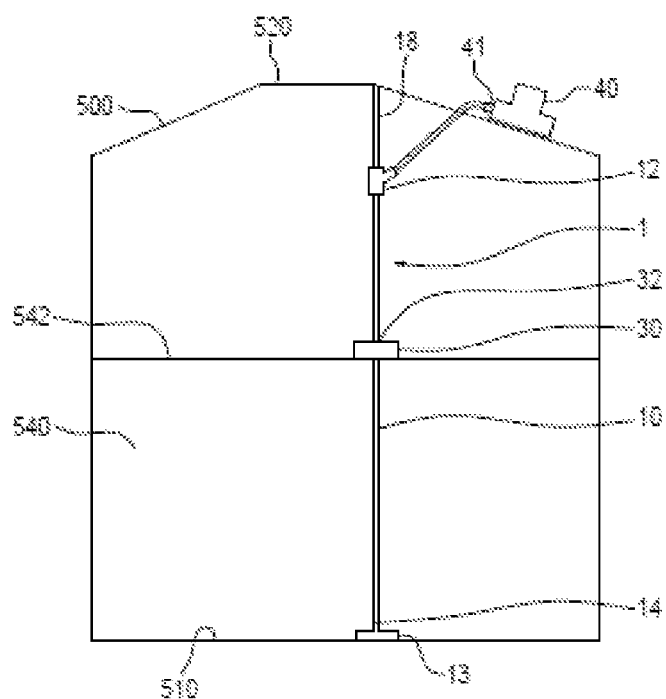
FIG. 5 is a schematic illustration of the liquid level measuring system installed in a tank.

FIG. 5 illustrates the liquid level measuring system 1 installed in a tank 500. To install the liquid level measuring system 1 in the tank 500, a user can attach the distal end 14 of the sensor string 10 to an anchor or a weight 13, which in turn, can be placed on a bottom 510 of a tank 500. The float 30 can then be positioned around the sensor string 10 so that the sensor string 10 extends through the aperture 32 in the float 30. With the float 30 in position around the sensor string 10, the user can then attach the proximate end 12 of the sensor string 10 to a top 520 of the tank 500 so that the sensor string 100 is oriented substantially vertically in the tank 500. In one aspect, a cable support 18 can be used to attach the proximate end 12 of the sensor string 10 to the top 520 of the tank 500.

The user can select a sensor string 10 that corresponds with the depth of the tank 500 the liquid level measuring system 1 is to be installed in. In one aspect, the controller 40 can operate with sensor strings 10 that can have various amounts of sensors 20. In one aspect, the sensor string 10 used can have anywhere from five (5) to two hundred (200) sensors 20 in a sensor string 10. With the sensor string 10 selected by the user so that it corresponds to the depth of the tank 500, the sensor string 10 can be connected to the controller 40. When the liquid level measuring system 1 is in use, the controller 40 can obtain information about the selected sensor string 10 from the memory 22 of the sensor string 10 such as the number of sensors 20 in that particular sensor string 10, the sensor spacing SP of the sensors 20 in the selected sensor string 10 and the position of each sensor 20 in the selected sensor string 10 relative to the other sensors 20. In this manner, a controller 40 can be used with various lengths of sensor strings rather than be made to operate with only one specific length of sensor string or requiring the controller 40 to be calibrated for a selected sensor string 10 length.

With the liquid level measuring system 1 installed in the tank 500, the level of the liquid 540 in the tank 500 can be approximated by the liquid level measuring system 1. The float 30 encircling the sensor string 10 can float on a top surface 542 of the liquid 540 in the tank 500. Sensors 20 in the sensor string 10 that are located in close enough proximity to the float 30 will be subjected to the magnetic field 36 created by the float 30 and will provide a voltage output proportional to the strength of the magnetic field each sensor 20 is subjected to by the float 30. The controller 40 can obtain these output voltages from the sensors 20 and approximate the position of the float 30 relative to the sensor string 10 using these output voltages.

By selection of the sensor spacing SP between adjacent sensors 20, more than one sensor 20 can be subjected to the magnetic field 36 created by the float 30. In this manner, two or more sensors 20 will provide an output in relation to the magnetic field 36 created by the float 30, allowing a more accurate determination of the float 30 relative to the sensor string 10.

Figure 6:
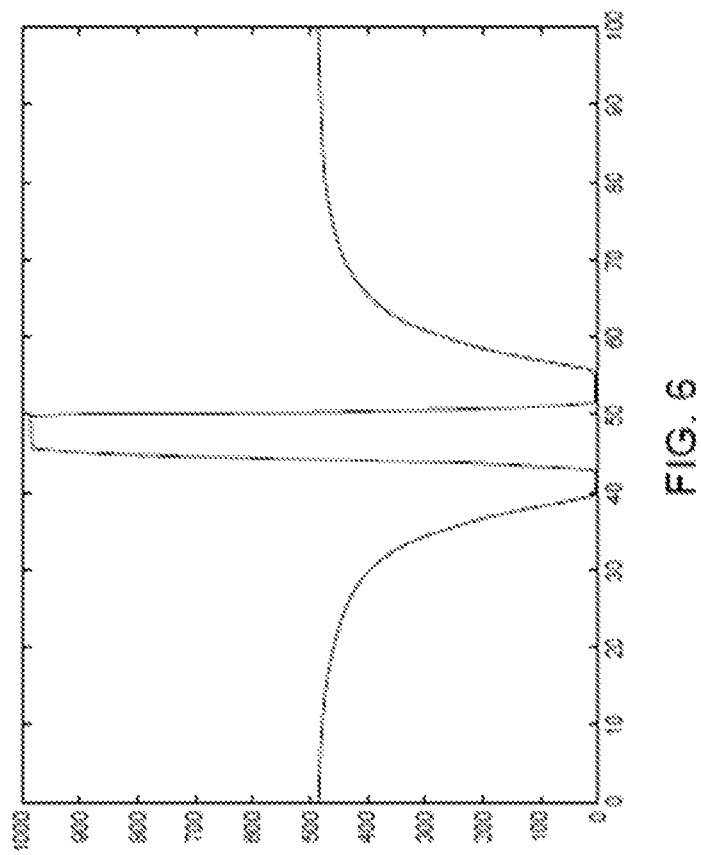
FIG. 6 is a graph of a normalized voltage output relative to the position of a magnetic field relative to a hall-effect sensor.

FIG. 6 illustrates a waveform of the normalized output voltages of the sensors 20 in the sensor string 10 in relation to the position of the float 30 relative to the sensor 20. The vertical axis represents a normalized voltage output of the hall-effect sensor 20 while the horizontal axis represents the position of the float 30 relative to the sensor 20. As can be seen in the graph, the output voltage of the sensor 20 varies based on the position of the float 30 relative to the sensor 20, with the highest output voltage being produced when the float 30 is directly adjacent to the sensor 20. As the float 30 is moved away from the sensor 20, either above or below the sensor 20, the output voltage will vary as shown in the graph. By using the graph and a voltage output from the sensor 20 the position of the float 30 relative to the sensor 20 can be determined.

In one aspect, the waveform can be of voltage outputs for a particular sensor and the controller 40 can normalize the voltage outputs of the waveform during operation.

A person skilled in the art will appreciate that various types and makes of hall-effect sensors will produce various outputs in relation to the strength of the magnetic field and the graph of the normalized output voltages relative to the position of the float 30 may vary depending on the make and type of hall effect sensor used and variations in sensors.

Figure 7:
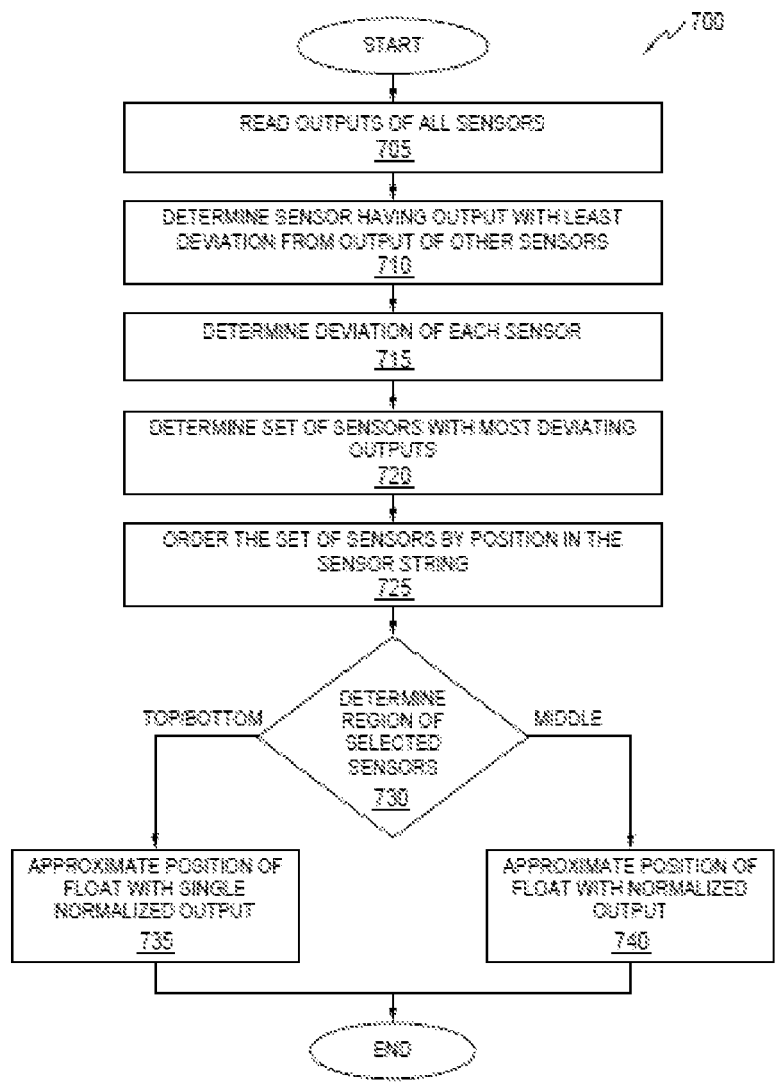
FIG. 7 is a flowchart of a method for approximating a level of liquid in a container.

FIG. 7 illustrates a flowchart of a method 700 that the controller 40 can use to approximate the position of the float 30 relative to the sensor string 10 and thereby determine the level of the liquid in a container using the output voltages of the sensors 20 in the sensor string 10. The method 700 can comprise the steps of: reading all of the outputs of the sensors at step 705; determining the sensor with the least deviation from the other sensors at step 710; determining the normalized deviation of each sensor 715; determining the set of sensors with the most deviating outputs 720; ordering the set of sensors by their position in the sensor string at step 725; determining the region the float is positioned in at step 730; and approximating the position of the float at step 735 of step 740.

The method 700 begins and at step 705 the controller 40 obtains the outputs from each of the sensors 20 in the sensor string 10. The output is typically an analog voltage. The controller 40 can then use these outputs to determine which sensor 20 has an output that deviates the least from the other sensors 20 in the sensor string 10 at step 710. This sensor 20 having an output that deviates the least relative to the outputs of the other sensors 20 can then be used as the base output of the normal sensor 20.

At step 715 the output of the normal sensor 20 at step 710 can be used to determine the deviation of each sensor 20.

The controller 40 can then use these deviations to determine a set of sensors 20 in the sensors string 10 that deviate the most from the measured output of the normal sensor 20 at step 720. The sensor 20 with the output that deviates the greatest from the output of the normal sensor 20 will likely be the sensor 20 that the float 30 is closest to. Therefore, the position of the float 30 should be known at this point to be within one sensor spacing SP of the sensor 20 providing the output that deviates the most from the output of the normal sensor 20. However, to obtain a more accurate approximation of the position of the float 30, the normalized deviations of a number of sensors 20 in the sensor string 10 can be used in conjunction with the waveform 414 stored in the memory 440 of the controller 40. The set of sensors 20 determined at step 720 could be as few as two (2), however, in one embodiment, it is desirable to have the set of sensors 20 contain three (3) sensors 20. In this manner, the sensors 20 with the next two greatest normalized deviations from the output of the normal sensor 20 can also be used in the set of sensors 20.

At step 725 the set of sensors 20 determined at step 720 can be ordered by their position in the sensor string 10. Typically, the sensor 20 with the output having the greatest deviation will be the sensor 20 that lies closest to the float 30. The sensors 20 with outputs having the next two greatest deviations from the output of the normal sensor will typically be the sensors 20 positioned adjacent to either side of the sensor 20 having the output deviating the greatest from the output of the normal sensor 20. However, this is not necessarily true if the float 30 is positioned between the last two sensors 20 in the sensor string 10 or the first two sensors 20 in the sensor string 10. In these cases, the three sensors 20 with the outputs deviating the most from the output of the normal sensor 20 will likely either be the bottom three sensors 20 or the top three sensors 20 in the sensor string 10.

At step 730 the controller 40 can determine what region the selected set of sensors 20 are positioned in. The controller 40 will determine whether the selected set of sensors 20 are positioned at one end of the sensor string 10 (i.e. either at the distal end 14 or the proximate end 12 of the sensor string 10) or whether the selected sensors 20 are positioned in the middle of the sensor string 10. This can be determined by the controller 40 obtaining the positions of the sensors 20 in the selected set of sensors 20 from the memories 26 in the sensor string 10.

If at step 730 the controller 40 determines that the set of sensors 20 are positioned at the distal end 14 or the proximate end 12 of the sensor string 10, the controller 40 can approximate the position of the float 30 relative to the sensor string 10 at step 735 and thereby the level of the liquid in the container the liquid level measuring system 1 is installed in. The controller 40 can compare the normalized output of a single sensor 20 to the preloaded waveform 414 to determine the position of the float 30 relative to the sensor 20, in conjunction with the index of the sensor 20 in the sensor string 10 and the sensor spacing SP. One method of approximating the position of the float 30 when the float 30 is positioned at either the distal end 14 or the proximate end 12 of the sensor string 10 is method 800 shown in FIG. 8.

If at step 730 the controller 40 determines that the set of sensors 20 are positioned in the middle of the sensor string 10, the controller 40 can approximate the position of the float 30 relative to the sensor string 10 at step 740. The controller 40 can compare the normalized output of two of the sensors 20 to the preloaded waveform 414, in conjunction with the index of the sensor 20 in the sensor string 10 and the sensor spacing SP. One method of approximating the position of the float 30 when the float 30 is in the middle of the sensor string 10, is method 900 shown in FIG. 9.

Once the level of the liquid in the container has been approximated, the method 700 can end.

Figure 8:
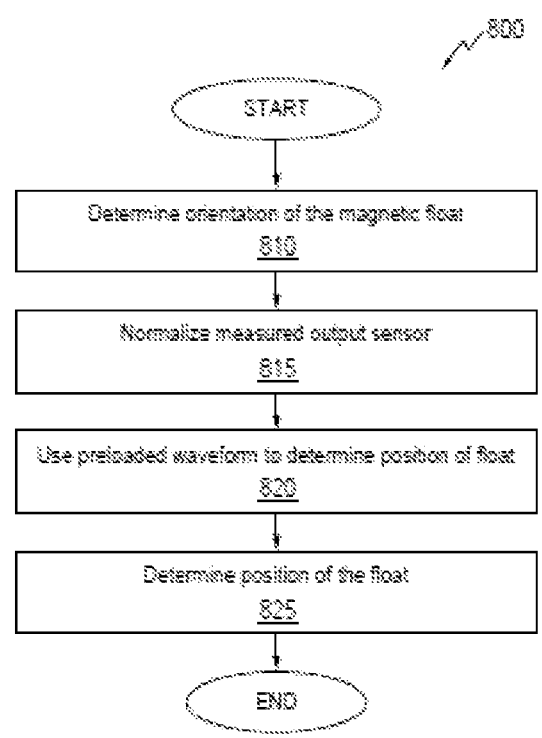
FIG. 8 is a flowchart of a method for approximating a level of a liquid in a container when the float is position at a top or bottom of the sensor string.

FIG. 8 illustrates a method 800 of determining the position of the float 30 relative to the sensor string 10 when it has been determined that the float 30 is positioned closest to the top or bottom sensor 20 in the sensor string 10. Because the float 30 is positioned closest to the top sensor 20 or the bottom sensor 20 in the sensor string 10, it will be positioned between the top or bottom sensor 20 and the next adjacent sensor 20. Therefore, only the reading of the sensor 20 adjacent to the top or bottom sensor 20 is compared to the preloaded waveform 414 in method 800 to determine the position of the float 30. To use the sensor 20 with the third greatest deviation would not be all that useful because the adjacent sensor 20 would lie between it and the float 30.

The method 800 can begin and at step 810 the method 800 can determine the orientation of the magnetic float 30. In one aspect, this can be done by using the measured output of the sensor 20 adjacent to either the top sensor 20 or the bottom sensor 20 in the sensor string 10. If the measured output of this adjacent sensor 20 is greater than the measured output of the sensor 20 determined to have the most normal output (the normal sensor 20 identified at step 710 in FIG. 7), then this could indicate that the float 30 is oriented relative to the sensor string 10, so that the magnet 34 in the float 30 has its north poles facing upwards. However, if the measured output of the adjacent sensor 20 is less than the measured output of the sensor 20 determined to have the most normal output, then this could indicate that the float 30 is oriented relative to the sensor string 10 so that the magnet 34 with the south pole oriented downwards.

Once the method 800 determines the orientation of the float 30, the method 800 can move on to step 815 where the measured output from the sensor 20 adjacent to either the top or bottom sensor in the sensor string 10 is normalized. The measured output of the adjacent sensor 20 is normalized to remove the units of measurement from the reading and to create a ratio that is independent of the specific sensor 20 in the sensor string 10. In one aspect, this can be done by using the following equation:

$$NormalizedValue = \frac{OutputAdjSensor - OutputNormalSensor}{OutputNormalSensor} \quad [1]$$

The normalized value can then be used at step 820 to determine the position of the float 30 relative to the adjacent sensor 20 by comparing the normalized value to the values of the preloaded waveform 414. By determining where on the preloaded waveform 414, such as the waveform shown in FIG. 6, the normalized value corresponds to, the position of the float 30 relative to the adjacent sensor 20 can be approximated. If it is determined that the float 30 is oriented with the north poles of the magnets 34 facing upwards at step 810, the right side of preloaded waveform 414 can be compared to the normalized value to determine how far away the float 30 is positioned from the sensor 20. However, if at step 810 it is determined that the float 30 is oriented so that the south poles of the magnets 34 of the float 30 are facing upwards, the left side of the preloaded waveform 414 can be compared to the normalized value to determine how far away from the sensor the float 30 is positioned.

The method 800 can then move to step 825 and determine the height of the float 30 by using the distance of the float 30 relative to the adjacent sensor 20 determined at step 820. If the float 30 is closest to the top sensor 20 in the sensor string 10, the number of sensors 20 in the sensor string 10, the sensor spacing SP and the position relative to the second sensor 20 of the float 30 can be used to approximate the height of the float 30. If the float 30 is closest to the bottom sensor 20, the distance determined at step 825 can be used to approximate the height of the float 30.

With the height of the float 30 determined at step 825 the method 800 can end.

Figure 9:
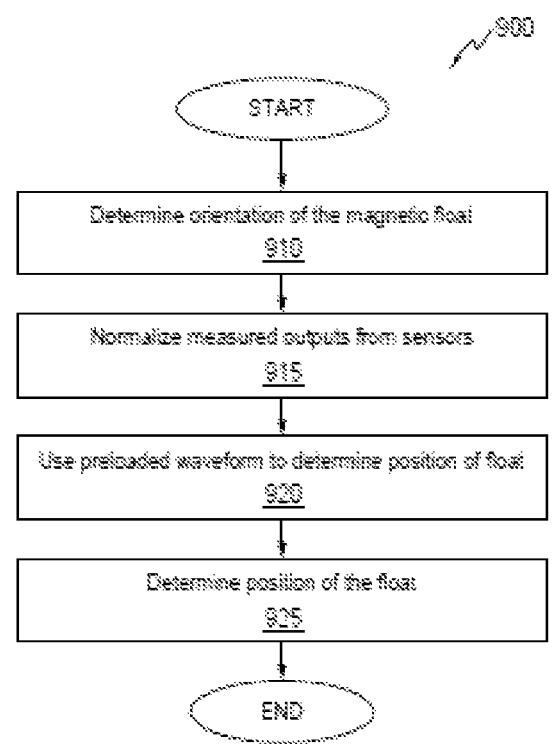
FIG. 9 is a flowchart of a method for approximating a level of a liquid in a container when the float is positioned in the middle of a sensor string.

The method 800 shown in FIG. 8 can be used to determine the position of the float 30 when it is positioned closest to either the top sensor 20 or the bottom sensor 20 in the sensor string 10. However, in most cases the float 30 will be positioned somewhere in the middle of the sensor string 10 with the sensor 20 positioned closest to the float 30 being a sensor 20 other than the top sensor 20 or the bottom sensor 20. FIG. 9 illustrates a method 900 for approximating the position of the float 30 when the float 30 is closest to a sensor 20 that is not the top or bottom sensor 20 in the sensor string 10. This sensor 20 can be thought of as the center sensor 20 and will be the sensor 20 with the measured output that deviates most from the measure output of the normal sensor 20. Because this center sensor 20 will have sensors 20 adjacent to it both above and below it, the measured outputs of the sensors 20 above and below the center sensor 20 can be used to determine the position of the float 30 relative to these two adjacent sensors 20.

The method 900 can begin and at step 910 the orientation of the float 30 can be determined. In one aspect, this can be done by determining if more than one of the three measured outputs that deviate the most from the measured output of the normal sensor 20 is greater than the measured output of the normal sensor 20. If this is true, this could indicate that the float 30 is oriented so that the north poles of the magnets 34 are facing upwards. However, if it is not true, then this could indicate that the float 30 is oriented so that the south poles of the magnet 34 are facing downwards.

At step 915 the measured outputs of the sensors 20 adjacent to the center sensor 20 can be normalized. In one aspect, if it is determined at step 810 that the float is oriented so that the north pole of the magnet 34 is oriented upwards, the measured output of the sensor 20 below the center sensor 20 can be divided by the measured output of the sensor 20 below the center sensor 20. In one aspect, the equation could be as follows:

$$NormalizedValue = \frac{OutputSensorAbove}{OutputSensorBelow} \quad [2]$$

where OutputSensorAbove is the measured output of the sensor 20 directly adjacent to and above the center sensor 20 and OutputSensorBelow is the measured output of the sensor 20 directly adjacent to and below the center sensor 20.

If at step 910 it is determined that the south pole of the magnet 34 of the float 30 is facing upwards, the measured outputs can be normalized by subtracting the measured output of the sensor 20 below the center sensor 20 from twice the measured output of the normal sensor 20 and dividing the measured output from the sensor 20 above the center sensor 20 subtracted from twice the measured value of the normal sensor 20 as follows:

$$NormalizedValue = \frac{OutputSensorNormal - OutputSensorBelow + OutputSensorNormal}{OutputSensorNormal - OutputSensorAbove + OutputSensorNormal} \quad [3]$$

where OutputSensorAbove is the measured output of the sensor 20 directly adjacent to and above the center sensor 20, OutputSensorBelow is the measured output of the sensor 20 directly adjacent to and below the center sensor 20 and OutputSensorNormal is the measured output of the sensor 20 determined to be the normal sensor 20.

This normalized value can then be used by the method 900 at step 920 to determine the position of the float 30 relative to the sensors 20. The normalized value can be compared to the preloaded waveform 414 to determine where on the preloaded waveform 414 the normalized value falls and see the distance from the sensor 20 above the center sensor 20 this value corresponds to. If at step 910 it was determined that the float 30 is oriented so that the north poles of the magnet 34 are oriented upwards, then the normalized value can be compared to the left side of the preloaded waveform 414 to determine the distance of the float 30 from the sensor 20 above the center sensor 20. This normalized value could be the value determined using an equation such as equation [2]. In one aspect, if the preloaded waveform 414 is expressed as an array, the equation used to determine the stored value of the waveform could be:

$$StoredVal = \frac{Stored\_Waveform[Center - SP - (SP/2) + k]}{Stored\_Waveform[Center + SP/2 + k]} \quad [4]$$

where Center is the center point of the preloaded waveform 414, SP is the sensor spacing and k is a distance. The StoredVal can be determined for k ranging from 0 to the distances of the sensor spacing SP. The StoredVal for each point k can be compared to the normalized value, to see where the normalized value falls on the preloaded waveform 414. In one aspect, this can be determined when the stored value is first greater than the normalized value.

If, however, at step 910 it was determined that the float 30 is oriented with the south pole of the magnet 34 facing downwards, the normalized value determined for this situation can be compared to the preloaded waveform 414 to determine where this normalized value will fall on the waveform. The normalized value could be the normalized value found using an equation such as equation [3]. If the preloaded waveform 414 was expressed as an array, equation [4] could be used to determine where the normalized value corresponds to in the preloaded waveform 414.

With the value k determined at step 920, the method 900 can then move on to step 925 and the height of the float 30 can be approximated. If at step 910 it was determined that the north poles of the magnet 34 of the float 30 are facing upwards, the height of the float 30 can be approximated by using the position of the sensor 20 above the center sensor 20 plus the position, k, determined at step 920. If at step 910 it was determined that the south poles of the magnet 34 of the float 30 are facing upwards, the height of the float 30 can be approximated by using the position of the sensor 20 above the center sensor 20 minus the position, k, determined at step 920.

Once step 925 has been completed the method 900 can end.

By using the liquid level measuring system 1 a user can attach sensor strings 10 of various lengths to the controller 40 to allow the liquid level measuring system 1 to be customized to a particular application. The computer readable memories 26 in the chosen sensor string 10 will inform the controller 40 of the particulars of the chosen sensor string 10, allowing a user to simply connect a sensor string 10 of a desired length to the controller 40 without having to calibrate the controller. Additionally, by using the method 700 and a preloaded waveform 414 that is stored in the memory 440 of the controller 40 and that can be used to compare the normalized output of the sensors 20 in the sensor string 10 in relation to the position of the float 30, the controller 40 can simply be installed in a specific tank or other container and will operate without the need to calibrate the controller 40. This allows the present liquid level measuring system 1 to simply be installed in a specific container to operate without extensive configuration or calibration of the system.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A liquid level measuring system comprising:
a sensor string comprising a plurality of analog output hall-effect sensors and at least one non-transitory computer readable memory, each sensor spaced a sensor spacing away from an adjacent sensor, the at least one computer readable memory containing sensor string information including the number of sensors in the sensor string and the position of each sensor in the sensor string;
a float having a magnetic field and positionable relative to the sensor string; and
a controller containing at least one processing unit, at least one non-transitory memory and a sensor string interface for connecting the controller to the sensor string, the processing unit operative to:
obtain the sensor string information from the at least one non-transitory computer-readable memory of the sensor string;
obtain a preloaded waveform indicating the output of a sensor relative to the position of the float; and
approximating the position of the float relative to the sensor string using a normalized output of at least one of the sensors and the preloaded waveform,
wherein the preloaded waveform is stored in at least one of: the at least one non-transitory computer readable memory of the senor string; and the at least one non-transitory computer readable memory of the controller; and
wherein the processing unit is further operative to: obtain the outputs of all of the sensors; determine a normal sensor having an output that deviates the least from the outputs of the other sensors; determine a set of sensors having outputs with the greatest deviations from the output of the normal sensor; and use the normalized outputs of the set of sensors and the preloaded waveform to determine the position of the float relative to the sensor string.

2. The system of claim 1 wherein the sensor spacing is stored in the at least one non-transitory computer readable memory of the sensor string.

3. The system of claim 2 wherein each sensor in the sensor string is associated with a single non-transitory computer readable memory.

4. The system of claim 1 wherein the sensors in the sensor string are enclosed by a non-magnetic material.

5. The system of claim 4 wherein the material of the enclosure has a bend radius to allow the sensor string to be coiled.

6. The system of claim 1 wherein the float creates an axial magnetic field.

7. The system of claim 1 wherein the preloaded waveform indicates the normalized measured outputs of the sensors relative to the position of the float.

8. The system of claim 1 wherein the processing unit is further operative to normalize the measured outputs indicated in the preloaded waveform.

9. The system of claim 1 wherein the connection interface comprises an intrinsic barrier.

10. The system of claim 1 wherein the float has an aperture so that the sensor string can be inserted through the aperture in the float so that the float surrounds the sensor string.

11. The system of claim 1 wherein the float contains at least one magnet and wherein the controller is operative to determine the orientation of the magnet and base the approximation of the position of the float on the orientation of the magnet.

12. The system of claim 1 wherein the sensor string comprises a cable having a single communication wire operatively connected to each sensor in the sensor string and operative to communicate signals from the sensors to the controller when the sensor string is connected to the controller.

13. The system of claim 1 wherein each sensor outputs a voltage.

14. A method for measuring a liquid level in a container, the method comprising:
provided a container for holding a liquid having a depth;
selecting a sensor string having a distal end, a proximate end and a length corresponding to the depth of the container, the sensor string comprising a plurality of analog output hall-effect sensors and at least one non-transitory computer readable memory, each sensor spaced a sensor spacing away from adjacent sensors, the at least one non-transitory computer readable memory containing sensor string information including the number of sensors in the sensor string and the position of each sensor in the sensor string;
installing the sensor string in the container, positioning a float containing at least one magnet so that the float is positioned adjacent to the sensor string and connecting the sensor string to a controller;
the controller obtaining the sensor string information from the sensor string; and
when liquid is in the container, the controller approximating the position of the float relative to the sensor string using a normalized output of at least one of the sensors and a preloaded waveform indicating the output of the sensors relative to the position of the float,
wherein the controller approximates the position of the float relative to the sensor string by:
obtaining the outputs of all of the sensors;
determining a normal sensor having an output that deviates the least from the outputs of the other sensors;
determining a set of sensors having outputs with the greatest deviations from the output of the normal sensor; and
using the normalized outputs of the set of sensors and the preloaded waveform to determine the position of the float relative to the sensor string.

15. The method of claim 14 wherein the sensor string is installed in the container so that the sensor string is oriented vertically.

16. The method of claim 14 wherein the preloaded waveform indicates the normalized output of the sensors relative to the position of the float.

17. The method of claim 14 further comprising normalizing the outputs of the sensors indicated in the preloaded waveform.

18. The method of claim 14 further comprising, the controller determining the orientation of the float and approximating the position of the float relative to the sensor string using the orientation of the float.

19. The method of claim 14 wherein each sensor outputs a voltage.

* * * * *